Patented July 1, 1947

2,423,359

UNITED STATES PATENT OFFICE 2,423,359

DIAZONIUM FLUOSILICATES

Richard Haven Wiley, Wilmington, Del., assignor to E. I. du Pont de Nemours & Company, Wilmington, Del., a corporation of Delaware No Drawing. Application July 26, 1945, Serial No. 607,265

1 Claim. (Cl. 260—141)

This invention relates to diazonium fluosilicates and to a process for preparing them.

This invention has as an object the preparation of water-soluble diazonium salts that are stable in the dry state at 25° C. A further object is the preparation of diazonium salts from aromatic amine fluosilicates. Other objects will appear hereinafter.

These objects are accomplished by the invention of aromatic diazonium fluosilicates and their preparation by the reaction of a fluosilicate of a primary aromatic amine having an $NH_2$ group attached to aromatic carbon, with ethyl nitrite in an acidic liquid medium and the subsequent isolation of the aromatic diazonium fluosilicate.

In the preferred method of preparing the solid diazonium fluosilicates of this invention, the aromatic amine fluosilicate is first prepared by adding the amine to an excess of fluosilicic acid in an aqueous alcoholic medium, and isolating the precipitated amine salt. The solid amine fluosilicate is then suspended in glacial acetic acid, and ethyl nitrite is added as vapor to the suspension with cooling to keep the reaction mixture below 40° C. As the reaction proceeds, the suspended amine salt first dissolves, and then is reprecipitated as the diazonium fluosilicate. Diethyl ether is then added to the reaction mixture to complete the precipitation of the diazonium fluosilicate, and the diazonium salt is then filtered, washed with ether and alcohol, and dried.

The more detailed practice of the invention is illustrated by the following examples. There are, of course, many forms of the invention other than the specific embodiments.

EXAMPLE I

*Benzenediazonium fluosilicate*

Aniline fluosilicate was prepared by adding aniline to 27% aqueous fluosilicic acid in 95% alcohol. This salt was then recrystallized from 95% alcohol and dried. The dry salt analyzed as follows: Analysis: calculated for $(C_6H_5NH_2)_2H_2SiF_6$ N, 8.48%; found: N, 8.54%.

Six and six-tenths grams of this salt was suspended in 50 cc. of glacial acetic acid. Ethyl nitrite was passed into this suspension at room temperature with slight cooling of the reaction mixture to hold the temperature at about 40° C. As the reaction proceeded the suspended salt at first dissolved then reprecipitated in a different crystalline form as the diazonium salt. When the reaction was completed, the solution was cooled and 50 cc. of absolute ether added to complete the precipitation of the diazonium salt. The precipitated diazonium salt was collected on a filter, and washed with ether and with cold absolute alcohol. The solid was dried to give a yield of 7 grams of benzenediazonium fluosilicate. The diazonium salt was soluble in water and the aqueous solution gave a red precipitate with alkaline beta-naphthol indicating a coupling reaction. The aqueous solution also gave a precipitate with aqueous barium chloride and with aqueous sodium chloride indicating the presence of fluosilicate ions. The benzenediazonium fluosilicate obtained analyzed as follows: calculated for $(C_6H_5N_2)_2SiF_6$: N, 15.9%; found, N, 15.7%.

The temperature of decomposition of this compound was determined by heating a small amount in a glass vessel in an oil bath. At 95° C. and at 91° C. a vigorous decomposition with a slight explosion took place at once. The compound was held at 85° C. for ten minutes before a less vigorous decomposition occurred and was held one hour at 79–80° C. without vigorous decomposition.

EXAMPLE II

*o-Methoxybenzenediazonium fluosilicate*

Anisidine fluosilicate was prepared from orthoanisidine and 27% aqueous fluorsilicic acid in absolute alcohol. The dry salt analyzed as follows: calculated for $(CH_3OC_6H_4NH_2)_2H_2SiF_6$: N, 7.18%; found, N, 6.93%. Anisidine fluorsilicate was also prepared from anisidine by passing gaseous silicon tetrafluoride into an alcoholic solution of anisidine. The salt thus formed contained 6.3% nitrogen.

The salt was diazotized in glacial acetic acid suspension with ethyl nitrite as described in the previous example to give o-methoxybenzenediazonium fluosilicate.

The diazonium salt was soluble in water and the aqueous solution coupled with alkaline beta-naphthol to give a carmine-colored solid. The aqueous solution also gave a precipitate with both aqueous barium chloride and aqueous sodium chloride indicating the presence of fluosilicate ions. The diazonium salt gave the following analysis: calculated for $(o\text{-}CH_3OC_6H_4N_2)_2SiF_6$: N, 13.6%; found, N, 13.1%.

EXAMPLE III

*p-Carbethoxybenzenediazonium fluosilicate*

The fluosilicate of ethyl p-aminobenzoate was prepared by adding 27% aqueous fluosilicic acid to a solution of the amine in ethyl alcohol and was recrystallized from an alcohol-water mixture. The dry salt analyzed as follows: calculated for $(C_2H_5O_2CC_6H_4NH_2)_2H_2SiF_6$: N, 5.92%; Si, 5.92%; found, N, 5.8%; Si, 5.93%.

This salt was diazotized by the procedure described in Example I. The diazonium salt was completely soluble in acetic acid and was precipitated as a solid by adding ether. The carbethoxybenzenediazonium fluosilicate thus prepared was also soluble in water. The aqueous solution gave a red precipitate with beta-naphthol in a coupling reaction and gave a precipitate with barium chloride and aqueous sodium chloride indicating the presence of fluosilicate ions. The diazonium salt gave the following analysis: calculated for $(C_2H_5O_2CC_6H_4N_2)_2SiF_6$: N, 11.3%; Si, 5.65%; found, N, 11.2%; Si, 4.76%.

Example IV

*Preparation of p-fluorobenzoic acid from p-carbethoxybenzenediazonium fluosilicate*

Four and five-tenths grams of p-carbethoxybenzenediazonium fluosilicate was heated in a reaction vessel under condenser whereupon a spontaneous decomposition with copious evolution of gas took place. The liquid remaining was saponified with aqueous sodium hydroxide and on acidification of the saponification mixture 0.3 g. of a solid separated which, after recrystallization from water, had a melting point of 181.2–182.2° C. (corrected) and had a neutral equivalent of 136.7. The reported melting point for p-fluorobenzoic acid is 182° C. and the calculated neutral equivalent is 140.

Example V

*m-Chlorobenzenediazonium fluosilicate*

The fluosilicate of m-chloroaniline was prepared from m-chloroaniline and 27% aqueous fluosilicic acid in methanol as a solvent. Ethyl nitrite was passed into a suspension of 7.98 g. of the fluosilicate in 50 cc. of glacial acetic acid, the temperature being held at 30 to 35° C. during the diazotization. A solution was obtained which was treated with decolorizing charcoal and filtered. Absolute ether was then added until a slight cloudiness formed and on standing, crystals separated from the mixture. The precipitated m-chlorobenzenediazonium fluosilicate was found to be soluble in water and to form a colored precipitate when the aqueous solution was treated with alkaline beta-naphthol.

In addition to the aromatic amines of the examples, other primary aromatic amines can be used to form the diazonium fluosilicates provided they have a —NH₂ group attached to aromatic carbon, i. e., to carbon of an aromatic nucleus. The aromatic ring may contain constituents other than the amine groups provided the constituents do not interfere with the diazotization reaction. Other aromatic amines useful for forming the diazonium fluosilicates of this invention include the toluidines, the xylidines, the aminodiphenyls, p-phenetidine, p-nitroaniline, the aminophenols, benzidine, p-phenylenediamine, alpha-naphthylamine, beta-naphthylamine and the like. Aryldiazonium fluosilicates are preferred.

In the diazotization of the amine fluosilicate with ethyl nitrite the temperature of the reaction mixture is preferably kept below 40° C. in order to prevent reaction of the diazonium salt with unreacted amine.

The aromatic diazonium fluosilicates of this invention are solid, water-soluble, crystalline compounds which are stable in the solid state at 25° C. If heated to sufficiently high temperatures, they decompose explosively. However, under controlled conditions the diazonium fluosilicates when maintained at a temperature of about 10–20° C. below the temperature at which explosive decomposition occurs undergo a partial decomposition with evolution of gas to form fluoro-substituted aromatic compounds as illustrated by Example IV. The temperature of explosive decompositions varies with different aromatic diazonium fluosilicates depending in large part on the substituent groups. The diazonium fluosilicates can also be used advantageously in dye-forming reactions with coupling components where stability of a diazonium salt at room temperature is an important factor.

The above description and examples are intended to be illustrative only. Any modification of or variation therefrom which conforms to the spirit of the invention is intended to be included within the scope of the claim.

What is claimed is:

Benzenediazonium fluosilicate.

RICHARD HAVEN WILEY.

REFERENCES CITED

The following references are of record in the file of this patent:

UNITED STATES PATENTS

| Number | Name | Date |
| --- | --- | --- |
| 1,799,069 | Schnitzspahn | Mar. 31, 1931 |
| 1,813,621 | Hentrich | July 7, 1931 |
| 1,847,513 | Hentrich | Mar. 1, 1932 |
| 2,211,465 | Jewel | Aug. 13, 1940 |

FOREIGN PATENTS

| Number | Country | Date |
| --- | --- | --- |
| 586,353 | Germany | Oct. 20, 1933 |
| 151,677 | Switzerland | Mar. 16, 1932 |

OTHER REFERENCES

Article "Diazonium Compounds," in Synthetic Organic Chemicals, published by Eastman Kodak Co., vol. V, No. 4, April 1932, pages 1 and 2. (Copy in Div. 43.) 260–141.